Aug. 9, 1932.    R. H. SMITH    1,870,787
LAMINATED SPRING FOR MOTOR VEHICLES
Filed Sept. 18, 1930    4 Sheets-Sheet 1
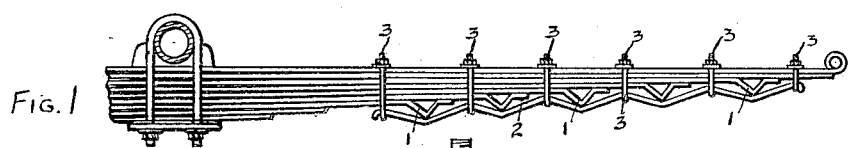
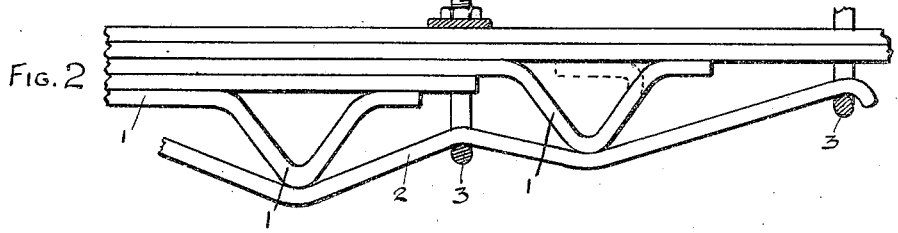
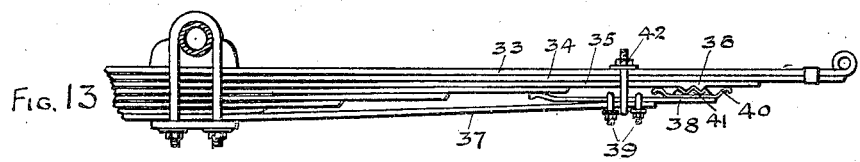
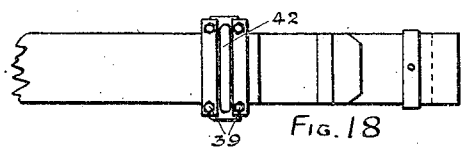
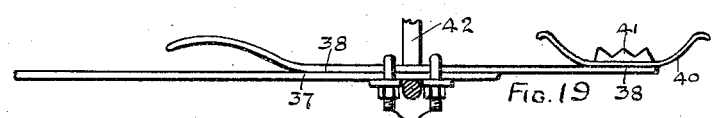
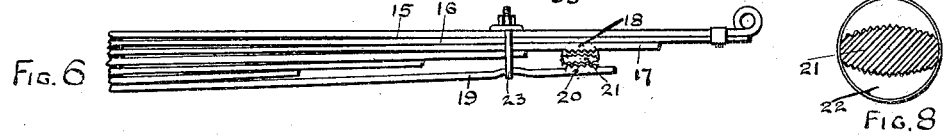
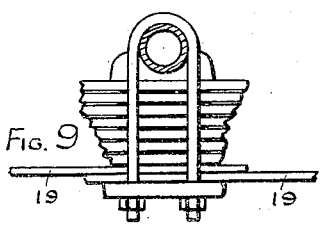
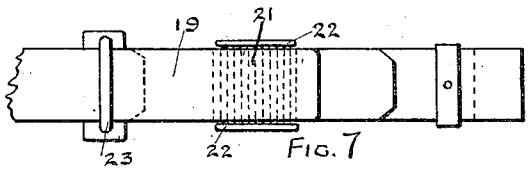
Inventor
Robert Henry Smith.
per Wm Wallace White.
Attorney.

Aug. 9, 1932.    R. H. SMITH    1,870,787
LAMINATED SPRING FOR MOTOR VEHICLES
Filed Sept. 18, 1930    4 Sheets-Sheet 2
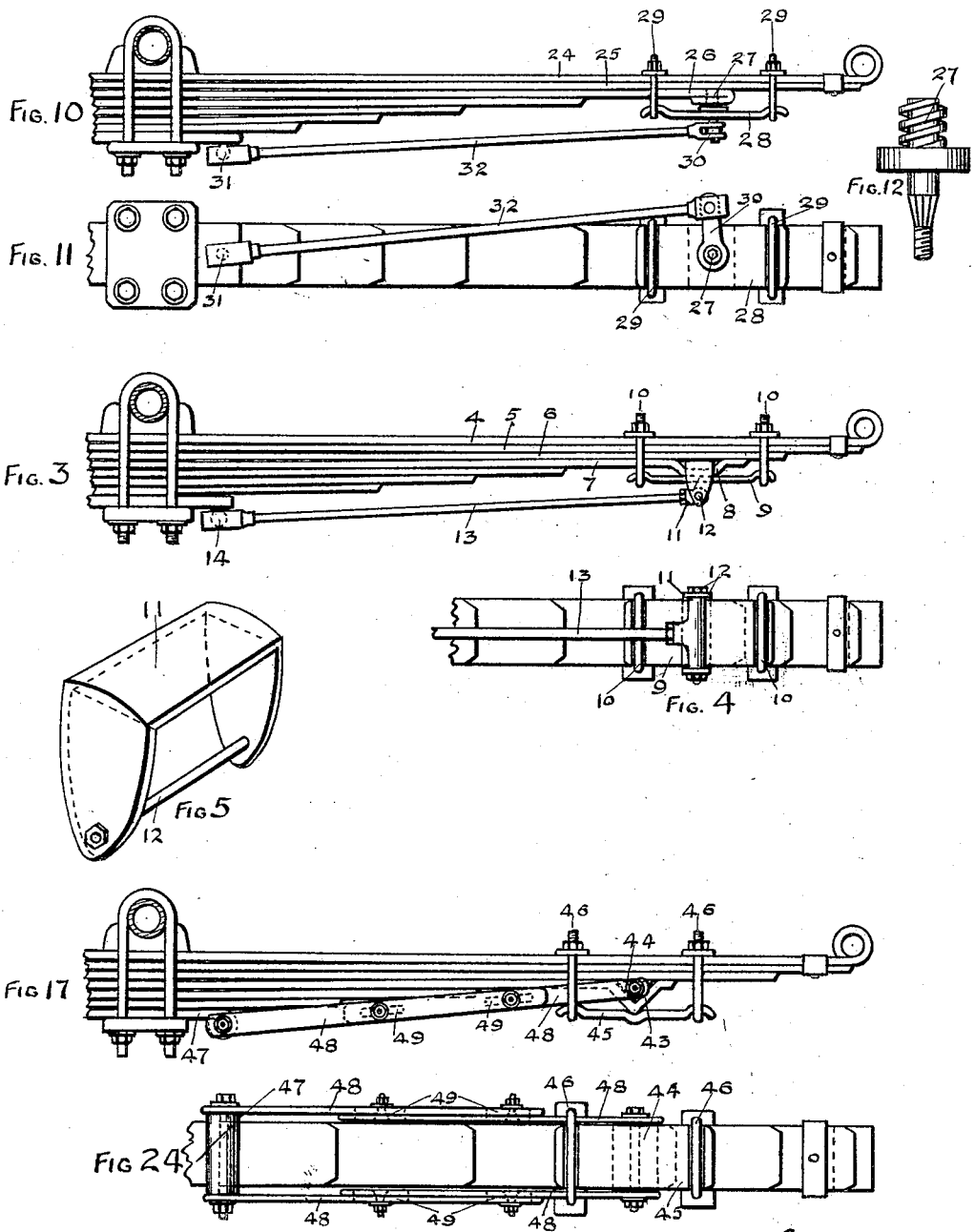
Inventor.
Robert Henry Smith
per Wm Wallace White
Attorney.

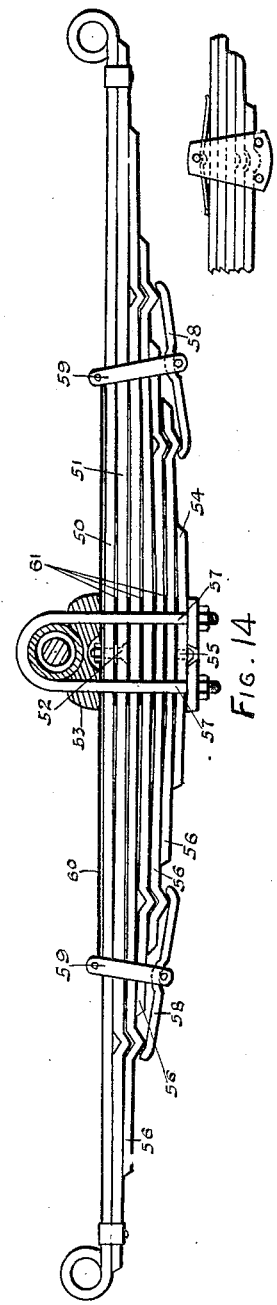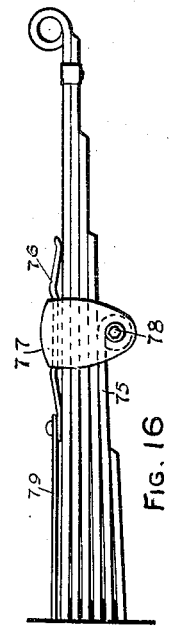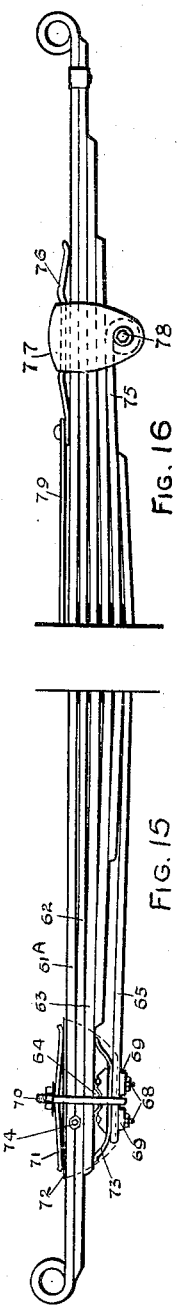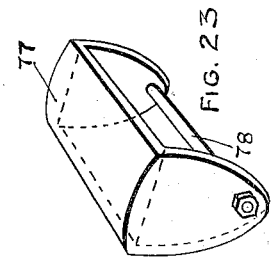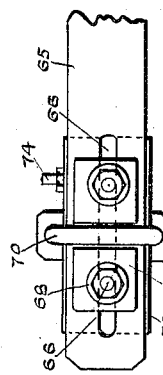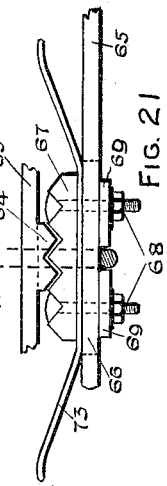

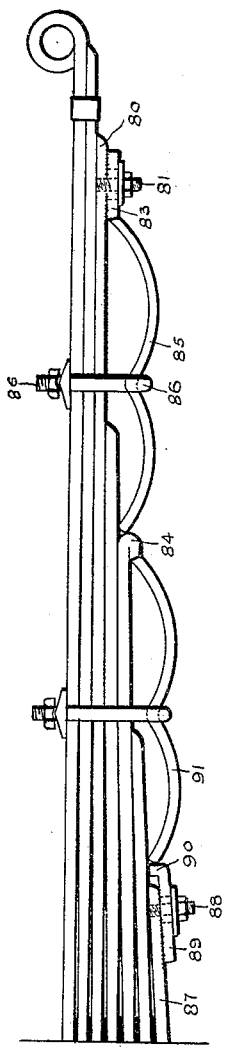
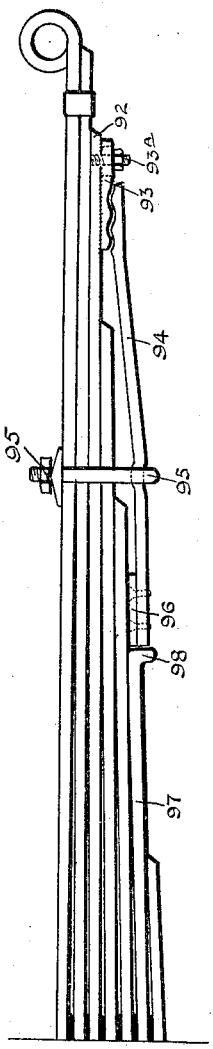
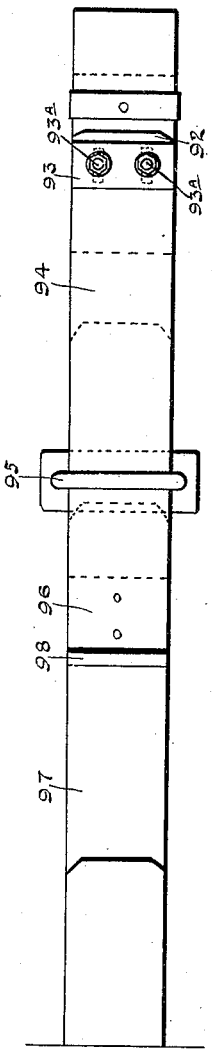

Patented Aug. 9, 1932 　　　　　　　　　　　　　　　　　　　　　　1,870,787

UNITED STATES PATENT OFFICE

ROBERT HENRY SMITH, OF BRISBANE, QUEENSLAND, AUSTRALIA

LAMINATED SPRING FOR MOTOR VEHICLES

Application filed September 18, 1930, Serial No. 482,758, and in Australia September 30, 1929.

This invention relates to improvements in laminated springs for motor vehicles, the objects of which are to produce a spring which will accommodate itself to the varying conditions of the roads on which vehicles travel; to limit the downward and upward movement of the spring under severe conditions without affecting the resilience under normal conditions; to automatically stiffen the springs under increasing loads; to reduce the unsprung weight; to prevent excessive vibration; to obviate the necessity of shock absorbers; to improve the steering of motor vehicles by minimizing rolling or skidding on rough roads or when negotiating curves; and to reduce the risk of breakage of the spring leaves.

The invention consists in embracing in the spring itself a damping device which I effect by forming on the ends of a number of the leaves a rounded projection, said end projections seating in depressions formed in an extra basic or master leaf, the damping action is attained by the sliding of these leaves along their adjacent leaves and up the walls of the depressions, which creates added friction between all the leaves, they being held together by clips located along the length of the spring between the depressions and also in harnessing the force contained in the sliding action of the leaves; the varying distances moved by the different leaves and their changing relative positions during flexion being converted by mechanism, part or all of which is attached to or fabricated in the spring leaves, into progressive friction between the leaves themselves. This effectually prevents excessive flexing of the spring under severe conditions while leaving the spring resilient under normal conditions. This mechanism may consist of or make use of inclined planes, rollers, cams, levers, or screws, or other effective devices.

At the centre of the laminated spring where the bolt binds the several leaves together, I fit a piece of thin metal or other material between each leaf extending the full width of the leaves but only about three inches on each side of the centre bolt; this allows greater flexibility of the spring, improved lubrication and by increasing the height of the spring causes greater relative movement between the leaves as the spring flexes.

This invention under normal load is extremely flexible, the spring becoming stiffer with additional load and by such means that no breaking strain is imposed.

I will now describe three methods of applying the invention, viz: A, B and C.

In method A the spring is composed of five working leaves and one extra leaf to be explained later. The main and the second leaves being as in the orthodox spring; the third leaf however, where it usually terminates, is bent down about three-eighths of an inch and continued along parallel to the second leaf for a distance of about one and a half inches and then bent up the three eighths inch and terminated. This leaves a space about one and a half inches by three-eighths inch across the width of the spring. Passing through this space and filling it is the centre portion of an inverted U, the two ends reaching downwards about one and a half inches where they are drilled to hold a steel spindle.

Under the lower part of the third leaf and riveted to it is a piece of, say a quarter inch spring steel of the same width as the leaves and about six inches long, an eye being formed at each end to take a round rod U clip; these clips bind the main, second, third and the short leaf together by means of bars and nuts over the main leaf, only a light tension being applied to maintain position.

The extra leaf mentioned at starting is placed at the bottom of the leaves and extends about nine inches on each side of the centre. The steel pin in the bottom of the inverted U is then connected with this extra basic leaf by means of another steel rod which is fitted with a T at one end and a ball joint at the other end.

Flexing of the spring results in tilting of the inverted U and this causes added pressure and friction between the leaves above, this damping out excessive movement.

Method B of applying the invention makes use of a roller. The third leaf of the spring near its ends for a distance of two inches is made like a rack with the grooves across the width of the spring, the grooves being V shaped. A basic leaf reaches out to approximately the same length as the third leaf and is grooved across in a similar manner and distance.

Between these two leaves is placed a grooved roller of elliptic shape, with the short diameter vertical. An inverted U clip, bar and nuts hold the basic leaf to the main leaf and keeps the roller in close contact with both the racks.

As the spring flexes, the long diameter of the roller is brought nearer vertical and increases pressure between the leaves bound by the clip.

In method C of applying the invention, the main and second leaves are similar to the orthodox spring. The ends of leaf three however, are folded back to double thickness for a distance of say three inches and a screw thread tapped through the block so formed.

A screw is made with a threaded portion slightly longer than the thickness of the tapped block and to screw into it. A shoulder of larger diameter and say half inch deep is formed on the centre portion of the screw, the diameter being reduced again and splined, a final threaded portion of small diameter terminating it.

This screw is threaded into the tapped block and a short spring leaf with a hole of suitable size at its centre is placed over the screw, so that it is resting against the shoulder. Two U clips placed near its ends with bars and nuts above the main leaf hold this small spring in position.

A short arm is splined at one end and is fitted to the splined end of the screw, standing at right angles to the length of the spring. By means of a rod with adjustments provided for length and fitted at its other end with a ball joint, the short arm is linked up with a short basic leaf.

Flexing of the spring either up or down results in increased pressure between the leaves and prevents excessive movement.

To fully describe the invention, reference is now made to the accompanying drawings in which:—

Fig. 1 is a side elevation of the spring.
Fig. 2 is a side elevation to enlarged scale showing master leaf and inclined planes.
Fig. 3, side elevation of alternative device.
Fig. 4, plan view of underside.
Fig. 5, perspective view of saddle clip.
Fig. 6, side elevation of alternative device.
Fig. 7, plan view of underside.
Fig. 8, cross section of elliptic roller.
Fig. 9, fragmentary side elevation of central fastening showing method of adjustment.
Fig. 10, side elevation of alternative device.
Fig. 11, plan view of underside.
Fig. 12, side elevation of screw to enlarged scale.
Figs. 13 to 17 side elevation of alternate devices.
Fig. 24, plan view of underside of Fig. 17.
Figs. 25 and 26 side elevations of alternate devices.
Figs. 18 to 23, details of construction.
Fig. 27, plan view of underside of Fig. 26.

In Figures 1 and 2, the five component leaves are shaped as shown at 1; the master leaf 2 is held in contact with the projections by means of U bolts 3 and made secure by bars and nuts above the main leaf. Any suitable shape of projection may be used, or any number of leaves and the master leaf may be of multiple or single form.

In Figure 3 the main, second and third leaves 4, 5 and 6 are regular, the fourth leaf 7 being formed with a dropped portion 8. Riveted to the underside of 8 is a short auxiliary spring 9 kept in position by U bolts and nuts 10. A saddle clip 11, Figure 5, is placed in the dropped portion 8 and connected by means of a spindle 12 and rod 13, Figure 4 to a ball joint 14 on the basic leaf. Means are provided near 14 for adjusting the length of this rod. Any number of leaves may be used and any of these leaves may be adapted to hold the saddle clip, which may be of any shape or size capable of producing the same effect.

A flat spring master leaf may be used in place of rod 13 secured by additional nuts on U bolts made longer for the purpose, or to any other suitable mounting to produce a like effect.

In Figures, 6, 7, and 8 the leaves 15 and 16 are of regular construction, the third leaf 17 being made like a rack at 18. The master leaf 19 is made to a similar racked design at 20. An elliptical roller 21 with grooves along its length to match the racks 18, and 20 is fitted with flanges 22 and placed between these racks. 23 is a U bolt embracing 19 and the main spring. Figure 9 shows the method of adjustment of master leaf 19 on both sides of the axle, the same method being applicable with any type of axle mounting. Any suitable shape or rack or roller may be used, capable of producing the same effect. Any number of leaves may be used, any suitable one of which may contain the rack.

In Figure 10 the top and second leaves 24 and 25 are of regular form, the third leaf 26 being doubled back and tapped with a thread. The shouldered screw 27 Fig. 12 is screwed into 26 and a short spring leaf 28 having a hole at its centre is placed over the screw, and against the shoulder. Two U bolts 29 and nuts are used to hold the short spring 28 in position. A short lever 30 Figure 11 is fastened to the splined portion of the screw 27 and connected with a ball joint 31 by means of an adjustable rod 32 pivoted to 30. The ball joint 31 may be mounted in any suitable position and the screw 27 may be used in any of the component leaves.

In Figure 13 the main and second leaves 33 and 34 are of regular construction, the third leaf 35 being formed into a rack 36. The master leaf 37 and the racked auxiliary leaf 38 are bound by two U bolts 39 and nuts, being adjustable to register with 36. 40 is a dust shield, 41 is a rack, riveted or welded through the shield 40 to the auxiliary leaf 38. The assembly 37 to 41 is secured to the main spring by U bolts and nuts 42. Any suitable leaf may be formed to the rack 36, the rack being either integral or attached by any suitable means.

In Figure 14 the main and second leaves 50 and 51 are drilled and bolted together at or near their centres, the bolt and nut 52 serving to position the spring correctly on the axle pad 53. The bottom leaf 54 is also drilled and fitted with a rivet 55 for the same purpose. The intervening four leaves 56 are shaped like a V near one of their ends, these V's being adjusted to register under any chosen load, by sliding the leaves end-wise, the U bolts 57 to axle, being made tight afterwards. The auxiliary leaves 58 are fitted to bridge the pair of V's and fastened by bolts and plates 59 to embrace the component leaves above, the top end of the clips being positioned by means of a thin leaf 60 above the main leaf. An alternative clip using side plates, bolts, nuts and a bow spring is shown in Figure 20. Between all the leaves of the spring are centrally placed short lengths of spring steel or other suitable material 61. Any number of leaves may be used, the proportion of regular and irregular leaves being optional. The spacers 61 between the leaves may be used between any chosen number of the component leaves and the bolts and nuts 52 on rivet 55 may bind any number of leaves.

In Figure 15 the main and second leaves 61A and 62 are of regular construction, the third leaf 63 having welded or riveted to it the multiple V block 64. The master leaf 65 has two slotted holes 66 so that the block 67 can be adjusted to register with 64 this position being secured by bolts 68 fitted with washers 69 and nuts the washers being spaced to position the U bolt 70.

The bow spring 71 is mounted above a dust shield 72, the shield being extended down both sides of the spring and enclosing the V block 64 and 67. 73 is a dust shield. An oiler nipple 74 is fitted in the dust shield 72 for admitting lubricant. The V block 64 may be used on any leaf or number of leaves and the block 67 may be secured to the leaf 65 by any suitable means.

In Figure 16 the four top leaves are of regular construction, the fifth leaf 75 being turned into an eye at its end and fitted with a bush. An auxiliary spring 76 is placed above the main leaf, and the saddle clip 77 connects 75 and 76, a bolt 78 securing it. The position of 76 is secured by it being riveted to a short leaf 79, adjustment being made as in Figure 9. Any number of leaves may be used, the saddle clip 77 being pivoted in any one of them.

In Figure 17 one of the leaves 43 is formed to a V near its end and a triangular block 44 drilled lengthwise is placed in the space so formed. A short spring 45 is kept in position by U bolts 46 and nuts. The triangular block 44 is connected to an eye formed in the basic leaf 47 by means of side plates 48, these being adjustable for length by means of bolts and nuts fitted in slotted holes 49.

In Figure 25 the main and second leaves are regular, the third leaf 80 being fitted near the end with a stud 81 projecting downwards. A block of steel 83 is secured to leaf 80 by this stud, and a nut and washer, the contact surfaces being roughened by cross grooves to improve the grip. Longitudinal adjustment is allowed for by means of an enlarged hole in 83. The fifth leaf is folded back for a short distance to form a stop block 84. Between the stop 84 and the block 83 is placed a curved master leaf 85, fitted so that it fully occupies the distance 83 to 84 when the spring is loaded to a chosen extent, sufficient tension being applied to maintain position and prevent rattling.

The master leaf is secured by a U bolt, bar and nut 86, the bar and nut being designed to automatically remain locked against vibration. The basic leaf 87 is fitted with a stud 88 and block 89 similarly to 80 and 83 the block being bent at its end to form a stop 90. Between 90 and 84 a master leaf 91 is fitted similarly to 85. Flexing downwards of the spring causes a progressive increase of pressure and friction between the leaves. The master leaves may be of any effective shape, used between any chosen leaves and making contact at ends only or centrally also to produce a like effect. The master leaves may be attached to the stops by a hinged joint. The figure illustrates a single acting spring, the master leaves may be also fitted above the main leaf making the spring double acting.

In Figure 26 the top and second leaves are of regular form, the third leaf 92 being fitted with two studs 93A on which is mounted a block 93 having a number of grooves across its face. The master leaf 94 is made of a corresponding shape at its end and is kept in contact with 93 by means of a U bolt bar and self-locking nuts 95. 96 is a facing of brake lining attached by rivets to the master leaf 94. One of the component leaves 97 is bent to form a stop 98, the master leaf 94 being adjusted to register with 93 under any chosen load by means of movement allowed at stud holes in 93. The block 93 may be mounted on any suitable leaf by any suitable means and an adjustable stop similar to 89—90 may be used at 97—98.

I do not claim as new a number of the parts of the improved spring herein described. I disclaim spring leaves of regular shape as used in orthodox laminated springs; and auxiliary leaves and U bolts to hold together at a sustained pressure the component leaves of a laminated spring; or attachments, applicable to an orthodox laminated spring to produce increased friction between the component leaves, not actuated by spring flexion.

What I claim as my invention and desire to secure by Letters Patent is:—

1. A spring for motor vehicles comprising relatively movable component leaves and inclined planes on such leaves superposed in contact and adapted to slide upon each other when said component leaves move during flexion, in combination with additional spring means adapted to exert pressure upon said inclined planes and superposed leaves, and clip means for clamping said inclined planes to said pressure means and to the spring.

2. A spring for motor vehicles comprising relatively movable component leaves, inclined planes on such leaves superposed in contact and adapted to slide upon each other when said component leaves move relatively to each other during flexion, and longitudinal adjustment means to adjust said inclined planes to register in zero position when the spring is flexed to a predetermined degree.

3. A spring for motor vehicles comprising relatively movable component leaves, spacers between the leaves to increase the relative longitudinal movement thereof, V-shaped superposed portions integral with a plurality of said leaves and in frictional contact, and a master leaf clipped to the spring to resist longitudinal movement of said V-shaped portions with gradually increasing tension coincident with increasing deflection of the spring.

4. A spring for motor vehicles comprising a plurality of leaves, integral superposed V-shaped portions thereon, and a master leaf adjustably clipped to the spring and shaped to present inclined planes to each said V-shaped portion to oppose with gradually increasing tension longitudinal movement of the several leaves upon deflection of the spring in either direction.

In testimony whereof I have signed my name to this specification.

ROBERT HENRY SMITH.